United States Patent [19]
Freytag et al.

[11] 4,206,242
[45] Jun. 3, 1980

[54] METHOD OF REDUCING STORAGE LOSSES IN HARVESTED SUGAR BEETS

[75] Inventors: Arthur H. Freytag; Walter R. Akeson, both of Longmont, Colo.

[73] Assignee: The Great Western Sugar Company, Denver, Colo.

[21] Appl. No.: 948,672

[22] Filed: Oct. 5, 1978

[51] Int. Cl.² .............................................. A23B 7/14
[52] U.S. Cl. .................................. 426/310; 426/321; 426/414; 426/442; 127/42
[58] Field of Search .............. 426/313, 323, 331, 321, 426/312, 418, 419, 442, 310; 127/42, 46R

[56] References Cited
U.S. PATENT DOCUMENTS

| | | | |
|---|---|---|---|
| 2,063,628 | 12/1936 | Rutledge | 426/312 |
| 2,532,489 | 12/1950 | Ferguson | 426/323 X |
| 3,062,659 | 11/1962 | Hyson et al. | 426/323 X |
| 3,411,894 | 11/1968 | Lieberman et al. | 426/313 X |
| 3,904,774 | 9/1975 | Dymsza | 426/321 |

FOREIGN PATENT DOCUMENTS 1105222  4/1961  Fed. Rep. of Germany ........... 426/419

Primary Examiner—William F. Smith
Attorney, Agent, or Firm—Dennis K. Shelton; Bruce G. Klaas

[57] ABSTRACT

Harvested sugar beets are treated to reduce storage losses of recoverable sucrose by contacting the beets with propylene. The treatment may be effected by spraying an aqueous solution of propylene onto the beets, by dipping the beets into an aqueous solution of propylene, by contacting the beets with gaseous propylene, or by other suitable means. Propylene concentrations less than about 750 ppm, preferably in the range of about 10 to about 500 ppm, and more preferably about 20 to about 200 ppm, are effective to reduce storage loss of recoverable sucrose.

8 Claims, No Drawings

METHOD OF REDUCING STORAGE LOSSES IN HARVESTED SUGAR BEETS

BACKGROUND AND SUMMARY OF THE INVENTION

This invention relates to a method of reducing storage losses in harvested sugar beets and more particularly to treating harvested sugar beets with propylene to reduce storage losses of recoverable sucrose through invert sugar formation and cellular respiration.

In the commercial production of beet sugar, beets are commonly harvested, transported to a beet sugar production facility and then stored, such as in storage piles, at or near the production facility until such time as the harvested beets can be processed to obtain crystalline beet sugar. Sugar beets are commonly stored in piles which may be enclosed, but more typically are outside and exposed to existing weather and temperature variations. In some situations, beets are stored for as long as four to five months prior to processing.

It has been known that a portion of sucrose in stored sugar beets is lost during storage, primarily due to invert sugar formation and cellular respiration. To form invert sugars, sucrose is naturally degraded in the presence of invertase or sucrose synthetase to form the invert hexoses glucose and fructose. The beet cells then utilize the hexose sugars formed by inversion of sucrose, to provide energy required for cellular growth and maintenance, by oxidizing the hexose sugars to carbon dioxide and water. The net result of these natural processes is a loss of sucrose recoverable from the harvested sugar beets during subsequent processing of the beets. The major portion of storage sucrose loss is realized during the early portion of a typical storage period due to higher initial respiration rates caused by higher temperatures immediately succeeding harvest and wounding of the beet tissue during harvesting and piling of the beets.

In the past, attempts have been made to reduce sucrose losses during storage to improve both beet sugar purity and effective sucrose yields. Such attempts have included the utilization of storage trench and canopy systems, storage pile ventilating systems and means to reduce impact damage to beet tissue during piling. Although the foregoing approaches have been utilized to obtain some reduction in sucrose storage losses, they generally require relatively large capital expenditures and result in only a partial reduction in storage losses.

It has now been found that sucrose loss during storage of harvested sugar beets can be significantly reduced by contacting the harvested sugar beets with an effective amount of propylene. The beets can be contacted with propylene by dipping the beets in an aqueous solution of propylene, by spraying an aqueous solution of propylene onto the beets, by contacting the beets with gaseous propylene, or by other suitable means.

DESCRIPTION OF THE PRESENTLY PREFERRED EMBODIMENTS

According to the method of the present invention, harvested sugar beets are contacted with a quantity of propylene effective to reduce sucrose loss in the beets during handling and storage. The beets are preferably contacted with propylene as soon as is practical after harvesting to minimize sucrose loss.

Propylene is generally effective to inhibit respiration and invert sugar formation at concentrations less than about 750 ppm, but harvested sugar beets are preferably contacted with propylene at concentrations in the range of about 10 to about 500 ppm, more preferably about 20 to about 250 ppm and most preferably about 50 to about 150 ppm. At concentrations greater than about 750 ppm, it has been found that propylene exhibits a toxic effect on the beet tissue, and may in some cases promote respiration and invert sugar formation.

The harvested sugar beets may be contacted with either an aqueous solution of propylene or with propylene gas. In an aqueous solution, the sugar beets may be contacted with propylene by dipping the beets in the aqueous solution, by spraying the aqueous solution over the beets or by otherwise contacting the beets with the aqueous solution. When applied as an aqueous solution, the foregoing effective concentration ranges are determined as the propylene concentration in the air immediately surrounding the sugar beets after treatment, assuming all of the propylene dissolved in the aqueous solution evaporates into the surrounding air. Alternatively, the sugar beets may be treated by contacting the beets with gaseous propylene. Since propylene gas has a density greater than that of air, propylene gas may be conveniently provided to the top of a storage pile and allowed to diffuse throughout the pile.

It has been additionally determined that when the harvested sugar beets are contacted with an aqueous solution of propylene, the effectiveness of the propylene treatment may be dependent upon the pH of the aqueous solution of propylene. It is therefore a presently particularly preferred embodiment to adjust the pH of the aqueous solution to within the range of about 7 to about 9 prior to contacting the beets with the aqueous solution.

While the precise nature of the effect of propylene treatment of sugar beet tissue is not presently known, it is postulated that propylene may act as an ethylene inhibitor. Ethylene is known to be a natural plant hormone which stimulates respiration in sugar beet tissue and influences other physiological processes. The respiration rate of sugar beet tissue has been known to be directly proportional to the concentration of ethylene given off by the tissue (i.e., endogenous ethylene evolution). Addition of ethylene from an external source has also been known to stimulate respiration in harvested beet tissue. Propylene, having a chemical structure similar to that of ethylene, may act as an ethylene analog and occupy the same sites on membranes and enzymes as would otherwise be occupied by ethylene. Propylene, however, appears to exhibit only about 1/100th the activity of ethylene in promoting cellular respiration. For this reason, propylene may act as an ethylene inhibitor at relatively low concentration levels and thereby retard natural cellular respiration, while actually promoting respiration at relatively high concentration levels, such as at concentrations greater than about 750 ppm.

The foregoing principals may be better understood in association with the following examples. As used herein, beet quality measurements (sugar content, purity, invert sugar content and raffinose content) are made shortly after harvest ("initial") and again after the specified storage period ("end"). Sugar percentage is defined as the wet weight percentage of reducing sugars to total solids. Purity is defined as the weight percentage of sugar on total solids. "RDS" means refractometric dry substance.

EXAMPLE I

Twenty-pound samples of mechanically harvested sugar beets are placed into nylon net bags and then treated with propylene either by placing the samples in a gas-tight sealable bag and then injecting a sufficient amount of propylene gas into the bag to obtain the indicated propylene level ("gas" treatment), or by dipping the samples into an aqueous solution comprising dissolved propylene in a sufficient concentration so that when the samples are drained and placed in a gas-tight sealed bag, the air surrounding the samples will comprise propylene at the indicated level if all of the propylene dissolved in the water and remaining associated with the beets after draining is released into the air ("dip" treatment).

The samples are then stored at 55° F. for 40 days and then at 40° F. for an additional 106 days. The samples are tested for average respiration rate (in pounds/ton/day) after 22 days of storage and again after 40 days of storage (Table I), and are tested for weight and sugar loss (in pounds/ton/day) and quality after the 146 day storage period (Table II). Results are listed as the mean of ten samples for each treatment.

TABLE I

| Propylene Treatment | | Respiration Rate (lb/T/D) | | Weight Loss (lb/T/D) | Sugar Loss (lb/T/D) | Sugar Loss (lb/T/D) |
|---|---|---|---|---|---|---|
| Method | Concentration (ppm) | 1–22 Days | 1–40 Days | | | |
| Gas | 0 | 0.484 | 0.455 | 0.195 | 0.218 | 0.242 |
| Gas | 10 | 0.416 | 0.379 | +0.056 | 0.142 | 0.173 |
| Gas | 50 | 0.436 | 0.400 | 0.042 | 0.185 | 0.201 |
| Gas | 100 | 0.404 | 0.366 | +0.207 | 0.126 | 0.155 |
| Gas | 500 | 0.411 | 0.389 | +0.161 | 0.214 | 0.269 |
| Dip | 0 | 0.485 | 0.448 | +0.055 | 0.201 | 0.271 |
| Dip | 10 | 0.458 | 0.418 | +0.238 | 0.144 | 0.191 |
| Dip | 50 | 0.455 | 0.412 | +0.474 | 0.162 | 0.200 |
| Dip | 100 | 0.444 | 0.406 | +0.366 | 0.128 | 0.170 |
| Dip | 500 | 0.491 | 0.445 | +0.113 | 0.176 | 0.169 |

TABLE II

| Propylene Treatment | | Sugar (%) | | Purity (%) | | Invert Sugar (g/100 RDS) | | Raffinose (g/100 RDS) | |
|---|---|---|---|---|---|---|---|---|---|
| Method | Concentration (ppm) | Initial | End | Initial | End | Initial | End | Initial | End |
| Gas | 0 | 15.35 | 13.95 | 95.24 | 93.94 | .809 | 1.131 | .325 | .825 |
| Gas | 10 | 15.35 | 14.26 | 95.24 | 93.99 | .809 | 1.261 | .325 | 1.075 |
| Gas | 50 | 15.35 | 14.04 | 95.24 | 94.29 | .809 | 1.174 | .325 | 1.170 |
| Gas | 100 | 15.35 | 14.22 | 95.24 | 94.11 | .809 | 1.061 | .325 | .949 |
| Gas | 500 | 15.35 | 13.63 | 95.24 | 93.03 | .809 | 1.498 | .325 | 1.150 |
| Dip | 0 | 15.35 | 13.83 | 95.24 | 92.64 | .809 | 1.279 | .325 | 1.334 |
| Dip | 10 | 15.35 | 14.09 | 95.24 | 93.53 | .809 | 1.156 | .325 | 1.211 |
| Dip | 50 | 15.35 | 13.73 | 95.24 | 93.75 | .809 | 1.060 | .325 | 1.158 |
| Dip | 100 | 15.35 | 14.04 | 95.24 | 93.73 | .809 | 1.140 | .325 | 1.021 |
| Dip | 500 | 15.35 | 13.94 | 95.24 | 95.04 | .809 | 1.155 | .325 | 1.216 |

EXAMPLE II

Twenty-five pound samples are placed in nylon net bags and then treated with propylene as in Example I. The samples are then either stored outside under varying temperature conditions for 120 days, or at 55° F. for 48 days and then at 38° F. for 69 days. The samples are tested for weight and sugar loss, and for quality as in Example I. Results are listed in Tables III and IV as the mean value of fifty samples per treatment±the standard deviation.

TABLE III

| Propylene Treatment | | | Storage | | Loss (lb/T/D) | | |
|---|---|---|---|---|---|---|---|
| Method | Concentration (ppm) | Days | Temperature (°F.) | Weight | Sugar | Rec. Sugar | |
| Gas | 0 | 120 | varying | 2.510 ± 0.181 | 0.517 ± 0.028 | 0.569 ± 0.022 | |
| | 100 | 120 | varying | 1.738 ± 0.133 | 0.398 ± 0.019 | 0.469 ± 0.015 | |
| | 500 | 120 | varying | 1.590 ± 0.141 | 0.398 ± 0.017 | 0.561 ± 0.017 | |
| Dip | 0 | 120 | varying | 1.947 ± 0.155 | 0.390 ± 0.025 | 0.439 ± 0.020 | |
| | 100 | 120 | varying | 1.551 ± 0.115 | 0.334 ± 0.018 | 0.395 ± 0.015 | |
| | 500 | 120 | varying | 1.220 ± 0.118 | 0.316 ± 0.018 | 0.382 ± 0.015 | |
| Gas | 0 | 48/69 | 55/38 | 0.480 ± 0.141 | 0.368 ± 0.022 | 0.384 ± 0.019 | |
| | 100 | 48/69 | 55/38 | 0.118 ± 0.059 | 0.261 ± 0.014 | 0.275 ± 0.011 | |
| | 500 | 48/69 | 55/38 | 0.100 ± 0.080 | 0.230 ± 0.016 | 0.276 ± 0.013 | |
| Dip | 0 | 48/69 | 55/38 | 0.042 ± 0.136 | 0.323 ± 0.023 | 0.340 ± 0.018 | |
| | 100 | 48/69 | 55/38 | 0.144 ± 0.056 | 0.191 ± 0.012 | 0.220 ± 0.010 | |
| | 500 | 48/69 | 55/38 | +0.249 ± 0.059 | 0.147 ± 0.012 | 0.199 ± 0.010 | |

TABLE IV

| Propylene Treatment | | Sugar-% | | Purity - % | | Invert Sugar (g/100 RDS) | | Raffinose (g/100 RDS) | |
|---|---|---|---|---|---|---|---|---|---|
| Method | Concentration (ppm) | In | Out | In | Out | In | Out | In | Out |
| Gas | 0 | 15.33 | 14.39 | 92.47 | 89.63 | 0.507 | 1.066 | 0.530 | 0.809 |
| | 100 | 15.33 | 14.45 | 92.47 | 89.78 | 0.507 | 0.752 | 0.530 | 0.898 |
| | 500 | 15.33 | 14.31 | 92.47 | 89.54 | 0.507 | 1.115 | 0.530 | 0.781 |
| Water | 0 | 15.42 | 14.80 | 92.85 | 90.18 | 0.491 | 0.912 | 0.504 | 0.923 |

TABLE IV-continued

| Propylene Treatment | | Sugar-% | | Purity - % | | Invert Sugar (g/100 RDS) | | Raffinose (g/100 RDS) | |
|---|---|---|---|---|---|---|---|---|---|
| Method | Concentration (ppm) | In | Out | In | Out | In | Out | In | Out |
| dip | 100 | 15.42 | 14.79 | 92.85 | 90.15 | 0.491 | 0.865 | 0.504 | 0.783 |
|  | 500 | 15.42 | 14.50 | 92.85 | 90.13 | 0.491 | 0.852 | 0.504 | 0.827 |
| Gas | 0 | 16.78 | 15.05 | 92.99 | 91.55 | 0.454 | 0.716 | 0.496 | 1.247 |
|  | 100 | 16.78 | 15.15 | 92.99 | 91.97 | 0.454 | 0.681 | 0.496 | 1.110 |
|  | 500 | 16.78 | 15.53 | 92.99 | 91.38 | 0.454 | 0.745 | 0.496 | 1.047 |
| Water | 0 | 15.17 | 14.14 | 91.59 | 89.89 | 0.414 | 0.769 | 0.477 | 1.225 |
|  | 100 | 15.17 | 14.18 | 91.59 | 90.22 | 0.414 | 0.759 | 0.477 | 1.155 |
|  | 500 | 15.17 | 14.10 | 91.59 | 89.92 | 0.414 | 0.733 | 0.477 | 1.159 |
| Average gas | 0 | 16.06 | 14.72 | 92.73 | 90.59 | 0.481 | 0.891 | 0.513 | 1.028 |
|  | 100 | 16.06 | 14.80 | 92.73 | 90.88 | 0.481 | 0.717 | 0.513 | 1.004 |
|  | 500 | 16.06 | 14.92 | 92.73 | 90.46 | 0.481 | 0.930 | 0.513 | 0.914 |
| Average dip | 0 | 15.30 | 14.47 | 92.22 | 90.04 | 0.453 | 0.841 | 0.491 | 1.098 |
|  | 100 | 15.30 | 14.49 | 92.22 | 90.19 | 0.453 | 0.812 | 0.491 | 0.969 |
|  | 500 | 15.30 | 14.35 | 92.22 | 90.03 | 0.453 | 0.792 | 0.491 | 0.993 |

In each of the following examples, twenty-five pound samples of mechanically harvested sugar beets are placed in nylon net bags and then treated as indicated.

EXAMPLE III

Beet samples are contacted with propylene either by injecting 47.1 ml of propylene gas into an airtight bag containing 50 samples of the beets ("gas" treatment), by dipping the beet samples in an aqueous solution comprising propylene saturated water diluted 1 part propylene saturated water to 12 parts distilled water ("dip" treatment), or by spraying each beet sample with 48 ml of an aqueous solution comprising propylene saturated water diluted 1 part propylene saturated water to 12 parts distilled water ("spray" treatment).

The beet samples are stored outside in a conventional beet pile for a period of 75 days. The weight, sugar and recoverable sugar losses of the samples are as shown in Table V (expressed as the mean value of fifty sample bags±standard error):

TABLE V

| Propylene Treatment | | Loss (lbs/ton/day) | | |
|---|---|---|---|---|
| Method | Concentration (ppm) | Weight | Sugar | Recoverable Sugar |
| None (Control) | 0 | 2.229 ± 0.127 | 0.527 ± 0.026 | 0.641 ± 0.021 |
| Gas | 100 | 1.741 ± 0.072 | 0.454 ± 0.025 | 0.573 ± 0.020 |
| Spray | 100 | 1.690 ± 0.111 | 0.460 ± 0.023 | 0.618 ± 0.019 |

The sugar content, purity, invert sugar content and raffinose content of the samples are as shown in Table VI:

TABLE VI

| Propylene Treatment | | Sugar (%) | | Purity (%) | | Invert sugar (g/100 RDS) | | Raffinose (g/100 RDS) | |
|---|---|---|---|---|---|---|---|---|---|
| Method | Concentration (ppm) | Initial | End | Initial | End | Initial | End | Initial | End |
| None (Control) | 0 | 17.03 | 16.43 | 92.39 | 89.74 | 0.511 | 1.097 | 0.572 | 0.246 |
| Gas | 100 | 17.03 | 16.40 | 92.39 | 89.87 | 0.511 | 0.856 | 0.572 | 0.378 |
| Dip | 100 | 17.03 | 16.33 | 92.39 | 89.35 | 0.511 | 0.919 | 0.572 | 0.338 |

The propylene treated samples show 13.9 (gas) and 12.7 (spray) percent less sugar loss than the untreated samples (Table V), without obtaining an adverse effect on sugar quality (Table VI).

EXAMPLE IV

Beet samples are treated with propylene by the gas method of Example III and then stored for a period of 35 days at a temperature of 55° F., or either for a period of 82 or 117 days at a temperature of 55° F. for the first 35 daus amd 40° F. for the remainder of the period.

The storage loss of weight, sugar and recoverable sugar is shown in Table VII (expressed as the mean value of fifty samples±the standard error):

TABLE VII

| Propylene Concentration (ppm) | Storage Duration | Loss (lbs/ton/day) | | |
|---|---|---|---|---|
|  |  | Weight | Sugar | Recoverable Sugar |
| 0 | 35 | 2.228 ± 0.210 | 0.340 ± 0.044 | 0.419 ± 0.036 |
| 100 | 35 | 2.592 ± 0.253 | 0.281 ± 0.047 | 0.358 ± 0.039 |
| 0 | 82 | 1.832 ± 0.149 | 0.761 ± 0.043 | 0.917 ± 0.033 |
| 100 | 82 | 1.169 ± 0.101 | 0.467 ± 0.029 | 0.508 ± 0.029 |
| 0 | 117 | 0.603 ± 0.117 | 1.131 ± 0.074 | 1.196 ± 0.051 |

TABLE VII-continued

| Propylene Concentration (ppm) | Storage Duration | Loss (lbs/ton/day) | | |
|---|---|---|---|---|
| | | Weight | Sugar | Recoverable Sugar |
| 100 | 117 | 0.363 ± 0.116 | 0.657 ± 0.054 | 0.744 ± 0.041 |

The sugar content, purity, invert sugar content and raffinose content of the samples are as shown in Table VIII:

TABLE VIII

| Propylene Concentration (ppm) | Duration of Storage Days | Sugar (%) | | Purity (%) | | Invert Sugar (g/100 RDS) | | Raffinose (g/100 RDS) | |
|---|---|---|---|---|---|---|---|---|---|
| | | Initial | End | Initial | End | Initial | End | Initial | End |
| 0 | 35 | 16.97 | 17.04 | 91.78 | 90.97 | 0.487 | .977 | 0.523 | .128 |
| 100 | 35 | 16.97 | 17.27 | 91.78 | 91.04 | 0.487 | .954 | 0.523 | .143 |
| 0 | 82 | 16.97 | 14.98 | 91.78 | 87.34 | 0.487 | 2.254 | 0.523 | .199 |
| 100 | 82 | 16.97 | 15.81 | 91.78 | 90.06 | 0.487 | 1.519 | 0.523 | .146 |
| 0 | 117 | 16.97 | 10.68 | 91.78 | 84.42 | 0.487 | 5.488 | 0.523 | .268 |
| 100 | 117 | 16.97 | 13.42 | 91.78 | 87.23 | 0.487 | 2.853 | 0.523 | .214 |

As shown in Table VII, weight, sugar and recoverable sugar losses are substantially lowered by the propylene treatment for each of the 35, 82 and 117-day storage periods, while the beet quality (sugar, purity and invert sugars in Table VIII) for the 82 and 117-day storage periods is substantially enhanced.

EXAMPLE V

In order to compare the relative effectiveness of the various contact methods, twenty-five beet samples are treated with propylene at an effective concentration of approximately 100 ppm by the gas or dip treatment methods, or at an effective concentration of approximately 16.7 ppm (1×), 50 ppm (3×) or 100 ppm (6×) by the spray method. The samples are then stored at 55° F. for 60 days and then at 40° F. for 54 days. The weight and sugar loss (Table IX) and sample quality (Table X) are listed as the mean of twenty-five samples per treatment.

TABLE IX

| Propylene Treatment Method | Loss (lbs/ton/day) | | |
|---|---|---|---|
| | Weight | Sugar | Recoverable Sugar |
| None | −0.044 ± 0.072 | 0.384 ± 0.030 | 0.436 ± 0.025 |
| Gas | −0.062 ± 0.063 | 0.342 ± 0.034 | 0.412 ± 0.029 |
| Water Dip | −0.159 ± 0.097 | 0.330 ± 0.047 | 0.323 ± 0.041 |
| Water Spray-1X | −0.089 ± 0.093 | 0.389 ± 0.045 | 0.398 ± 0.039 |
| Water Spray-3X | −0.214 ± 0.081 | 0.378 ± 0.037 | 0.420 ± 0.031 |
| Water Spray-6X | −0.180 ± 0.141 | 0.329 ± 0.034 | 0.345 ± 0.029 |

TABLE X

| Propylene Treatment Method | Sugar (%) | | Purity (%) | | Invert Sugar (g/100 RDS) | | Raffinose (g/100 RDS) | |
|---|---|---|---|---|---|---|---|---|
| | In | Out | In | Out | In | Out | In | Out |
| None | 17.07 | 14.84 | 93.57 | 91.49 | 0.385 | 1.492 | 0.451 | 0.380 |
| Gas | 17.07 | 15.06 | 93.57 | 91.25 | 0.385 | 1.564 | 0.451 | 0.438 |
| Water Dip | 17.07 | 15.06 | 93.57 | 92.92 | 0.385 | 1.173 | 0.451 | 0.431 |
| Water Spray-1X | 17.07 | 14.77 | 93.57 | 92.40 | 0.385 | 1.497 | 0.451 | 0.434 |
| Water Spray-3X | 17.07 | 14.74 | 93.57 | 91.72 | 0.385 | 1.514 | 0.451 | 0.338 |
| Water Spray-6X | 17.07 | 15.06 | 93.57 | 92.44 | 0.385 | 1.343 | 0.451 | 0.459 |

EXAMPLE VI

Sugar beet samples are treated with propylene at a 100 ppm concentration level by the spray method of Example II except that the pH of the spray solution is varied by the addition of HCl or KOH, as appropriate to obtain the desired pH level, to determine the effect of pH variations on the effectiveness of the propylene treatment. The results are shown in Tables X and XII as the mean of twenty-five samples per treatment.

TABLE XI

| pH | Loss (lbs/ton/day) | | |
|---|---|---|---|
| | Weight | Sugar | Recoverable Sugar |
| (no propylene or pH adjustment) | 0.137 ± 0.080 | 0.525 ± 0.062 | 0.540 ± 0.052 |
| 6 | 0.094 ± 0.121 | 0.440 ± 0.049 | 0.469 ± 0.041 |
| 7 | +0.248 ± 0.119 | 0.314 ± 0.059 | 0.321 ± 0.059 |
| 8 | +0.329 ± 0.302 | 0.290 ± 0.060 | 0.295 ± 0.051 |
| 9 | +0.780 ± 0.211 | 0.267 ± 0.042 | 0.249 ± 0.037 |
| 10 | +0.128 ± 0.148 | 0.365 ± 0.045 | 0.401 ± 0.037 |

TABLE XII

| Propylene Treatment Concentration (ppm) | pH | Sugar (%) | | Purity (%) | | Invert Sugar (g/100 RDS) | | Raffinose (g/100 RDS) | |
|---|---|---|---|---|---|---|---|---|---|
| | | In | Out | In | Out | In | Out | In | Out |
| 0 | — | 17.08 | 14.20 | 93.06 | 91.20 | 0.397 | 1.977 | 0.510 | 0.311 |
| 100 | 6 | 17.08 | 14.65 | 93.06 | 91.23 | 0.397 | 1.444 | 0.510 | 0.470 |
| 100 | 7 | 17.08 | 15.08 | 93.06 | 92.10 | 0.397 | 1.307 | 0.510 | 0.400 |
| 100 | 8 | 17.08 | 15.12 | 93.06 | 92.22 | 0.397 | 1.064 | 0.510 | 0.491 |
| 100 | 9 | 17.08 | 14.90 | 93.06 | 92.78 | 0.397 | 1.078 | 0.510 | 0.416 |
| 100 | 10 | 17.08 | 14.88 | 93.06 | 91.32 | 0.397 | 1.527 | 0.510 | 0.313 |

The samples are tested for ethylene evolution after 7, 21, 42 and 84 days of storage. Ethylene evolution as a percentage of the control is listed in Table XIII.

TABLE XIII

| Propylene Treatment | | Endogenous Ethylene Evolution (% of Control) | | | | | Sugar Loss (% of Control) | |
| --- | --- | --- | --- | --- | --- | --- | --- | --- |
| Concentration (ppm) | pH | 7 Days | 21 Days | 42 Days | 84 Days | Mean 7,21,42 Days | Sugar 114 Days | Rec. Sugar 114 Days |
| 0 | — | 100.0 | 100.0 | 100.00 | 100.0 | 100.0 | 100.0 | 100.0 |
| 100 | — | 84.3 | 82.2 | 85.1 | 87.1 | 83.8 | 85.7 | 79.1 |
| 100 | 6 | 78.8 | 78.0 | 72.4 | 73.4 | 77.6 | 83.8 | 86.9 |
| 100 | 7 | 68.7 | 69.7 | 74.5 | 84.8 | 70.9 | 59.8 | 59.4 |
| 100 | 8 | 72.5 | 68.8 | 67.1 | 85.9 | 69.5 | 52.2 | 54.6 |
| 100 | 9 | 67.0 | 73.4 | 69.9 | 93.0 | 70.1 | 50.9 | 46.1 |
| 100 | 10 | 78.0 | 98.0 | 86.3 | 84.8 | 87.4 | 69.5 | 74.3 |
| Control | | 286 ppb/lb | 248 ppb/lb | 255 ppb/lb | 223 ppb/lb | 275 ppb/lb | 0.525 lb/T/D | 0.540 lb/T/D |
| L.S.D. 0.05 | | 11.5 | 15.1 | 14.9 | 13.3 | 13.8 | 9.9 | 8.5 |

In addition to reducing recoverable sucrose losses, it has been found that propylene treatment according to the foregoing principles is effective to significantly reduce beet rot and mold growth in beet storage piles.

While the invention has been described in terms of presently preferred embodiments, various modifications may be apparent to those skilled in the art. Such modifications are intended to be within the scope of the appended claims, except insofar as limited by the prior art.

What is claimed is:

1. A method of reducing sucrose loss during storage of harvested sugar beets, comprising contacting harvested sugar beets with an amount of propylene effective to reduce sucrose loss during subsequent storage of the beets.

2. The method of claim 1 wherein the sugar beets are contacted with propylene gas.

3. The method of claim 1 wherein the sugar beets are contacted with propylene by contacting the sugar beets with an aqueous solution comprising dissolved propylene.

4. The method of claims 2 or 3 wherein the sugar beets are contacted with less than about 750 ppm of propylene.

5. The method of claims 2 or 3 wherein the sugar beets are contacted with about 10 to about 500 ppm of propylene.

6. The method of claim 3 wherein the the sugar beets are contacted with an aqueous solution of dissolved propylene having a pH in the range of about 7 to about 9.

7. The method of claim 3 wherein the sugar beets are contacted with propylene by dipping the beets in the aqueous solution of propylene.

8. The method of claim 3 wherein the sugar beets are contacted with the propylene by spraying the aqueous solution of propylene onto the beets.

* * * * *